(12) United States Patent
Benage et al.

(10) Patent No.: US 6,300,533 B1
(45) Date of Patent: Oct. 9, 2001

(54) INHIBITION OF POLYMERIZATION OF ETHYLENICALLY UNSATURATED MONOMERS

(75) Inventors: Brigitte Benage, Wolcott; Angela M. Edwards, Middlebury; Vilen Kosover, Cheshire; Gan Wang, Wallingford; Anthony Gentile, Waterbury; Jesus Fabian, Hartford; Gerald J. Abruscato, Southington, all of CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 0 days.

(21) Appl. No.: 09/375,033

(22) Filed: Aug. 16, 1999

(51) Int. Cl.$^7$ .................... C07C 7/20; C09K 3/00

(52) U.S. Cl. .................. 585/5; 585/435; 252/183.12

(58) Field of Search ............... 585/3, 4, 5, 422, 585/435; 560/205; 252/183.12

(56) References Cited

U.S. PATENT DOCUMENTS

| | | | |
|---|---|---|---|
| 3,163,677 | 12/1964 | Hoffman et al. | 260/583 |
| 3,253,055 | 5/1966 | Goble et al. | 260/638.75 |
| 3,334,103 | 8/1967 | Feldman et al. | 260/290 |
| 3,372,182 | 3/1968 | Hoffmann et al. | 260/465.5 |
| 3,422,144 | 1/1969 | Hoffmann et al. | 260/570 |
| 3,494,930 | 2/1970 | Dupeyre et al. | 260/294.7 |
| 3,502,692 | 3/1970 | Feldman et al. | 260/326.3 |
| 3,704,233 | 11/1972 | Eich et al. | 260/285.5 |
| 3,873,564 | 3/1975 | Schneider et al. | 260/309.6 |
| 3,966,711 | 6/1976 | Rasberger | 260/239.3 |
| 4,182,658 | 1/1980 | Watson | 203/9 |
| 4,665,185 | 5/1987 | Winter et al. | 546/184 |
| 5,254,760 | 10/1993 | Winter et al. | 585/435 |

(List continued on next page.)

FOREIGN PATENT DOCUMENTS

| | | |
|---|---|---|
| 260755 B1 | 5/1989 | (CS) . |
| 0 178 168 A2 | 10/1985 | (EP) . |
| 0 765 856 A1 | 4/1997 | (EP) . |
| 2761060 | 9/1998 | (FR) . |
| 1127127 | 4/1966 | (GB) . |
| 334845 A1 | 1/1984 | (SU) . |
| 478838 | 7/1984 | (SU) . |
| 97/46504 | 12/1997 | (WO) . |
| 98/02403 | 1/1998 | (WO) . |
| WO 98/14416 | 4/1998 | (WO) . |
| 98/25872 | 6/1998 | (WO) . |

Primary Examiner—Joseph D. Anthony
(74) Attorney, Agent, or Firm—Raymond D. Thompson; Paul Grandinetti

(57) ABSTRACT

Disclosed herein is a method for inhibiting the premature polymerization of ethylenically unsaturated monomers comprising adding to said monomers an effective amount of an inhibitor having the structural formula:

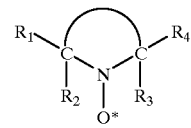

wherein $R_1$ and $R_4$ are independently selected from the group consisting of hydrogen, alkyl, and heteroatom-substituted alkyl and $R_2$ and $R_3$ are independently selected from the group consisting of alkyl and heteroatom-substituted alkyl and the

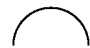

portion represents the atoms necessary to form a five-, six-, or seven-membered heterocyclic ring, at least one of said atoms being a carbon atom substituted with a primary, secondary, or tertiary amino group.

9 Claims, 1 Drawing Sheet

U.S. PATENT DOCUMENTS

| | | | |
|---|---|---|---|
| 5,545,782 | 8/1996 | Winter et al. | 585/435 |
| 5,545,786 | 8/1996 | Winter et al. | 585/435 |
| 5,877,344 | 3/1999 | Gande et al. | 560/205 |
| 5,888,356 * | 3/1999 | Keil et al. | 203/8 |
| 5,907,071 * | 5/1999 | Arhancet | 585/5 |
| 6,143,205 * | 11/2000 | Sutoris et al. | |
| 6,156,858 * | 12/2000 | Keoshkerian et al. | |

* cited by examiner

Polymer Made During Feed Shut-Off:
Comparison of TEMPO-type Inhibitors

INHIBITION OF POLYMERIZATION OF ETHYLENICALLY UNSATURATED MONOMERS

BACKGROUND OF THE INVENTION

1. Field of the Invention

The present invention is directed to the use of C-substituted-amino cyclic nitroxides, especially 4-amino-2,2,6,6-tetramethyl-1-piperidinyloxy, to inhibit the polymerization of ethylenically unsaturated monomers, especially, vinyl aromatic monomers and acrylic monomers.

2. Description of Related Art

Many ethylenically unsaturated monomers undesirably polymerize at various stages of their manufacture, processing, handling, storage, and use. A particularly troublesome problem is equipment fouling caused by polymerization in the purification stages of the production processes of such monomers. Polymerization, such as thermal polymerization, during their purification results in the loss of the monomer and a loss in production efficiency owing to the deposition of polymer in or on the equipment being used in the purification, deposits of which must be removed from time to time.

A wide variety of compounds has been proposed and used for inhibiting uncontrolled and undesired polymerization of ethylenically unsaturated monomers. However, these compounds have not been fully satisfactory. Accordingly, there has been a substantial need in the art for improved compositions for inhibiting the polymerization of such monomers during the distillation process for purifying or separating them from impurities, as well as during transport and storage. Additionally, the formation of soluble polymer leads to loss of monomer, i.e., a lower yield, and an increase in the viscosity of any tars that may be produced. The processing of the tars then requires higher temperature and work (energy cost) to remove residual monomer.

Hindered nitroxyl compounds are known to be very active inhibitors of free radical polymerizations of unsaturated monomers such as styrene, acrylic acid, methacrylic acid, and the like.

U.S. Pat. No 3,163,677 discloses N,N,O-trisubstituted hydroxylamines and N,N-disubstituted nitroxides of the formulae:

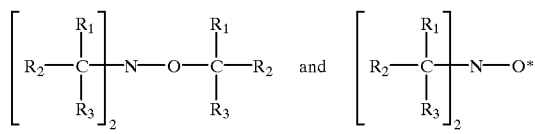

wherein $R_1$, $R_2$, and $R_3$ are each an alkyl radical having 1 to 15 carbon atoms. (As used herein, the designation N-O* denotes a stable free radical wherein the asterisk is an unpaired electron.) The N,N,O-trisubstituted hydroxylamines can be used to make the N,N-disubstituted nitroxides, which are stable free radicals and are said to be useful as polymerization inhibitors.

U.S. Pat. No. 3,334,103 discloses that nitroxides can be prepared from the corresponding heterocyclic amine wherein the nitrogen atom of the nitroxide group is attached to other than a tertiary carbon of an aliphatic group (i.e., the nitrogen atom forms a part of a heterocyclic nucleus). These nitroxides are said to have useful properties similar to those described for the N,N-disubstituted nitroxides of U.S. Pat. No. 3,163,677.

U.S. Pat. No. 3,372,182 discloses that a great variety of N,N-disubstituted, stable, free radical nitroxides not otherwise readily available can be prepared by a simple and convenient process that comprises pyrolyzing in an inert reaction medium virtually any hydroxylamine that is susceptible to cleavage of the O—C bond (e.g., tri-t-butylhydroxylamine).

U.K. Patent Number 1,127,127 discloses that acrylic acid can be stabilized against polymerization by the addition thereto of a nitroxide having the essential skeletal structure:

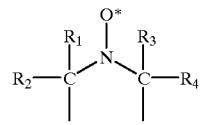

wherein $R_1$, $R_2$, $R_3$, and $R_4$ are alkyl groups and no hydrogen is bound to the remaining valencies on the carbon atoms bound to the nitrogen. The two remaining valencies that are not satisfied by $R_1$ to $R_4$ or nitrogen can also form part of a ring (e.g., 2,2,6,6-tetramethyl-4-hydroxy-piperidine-1-oxyl).

U.S. Pat. No. 3,422,144 discloses stable, free radical nitroxides of the formula:

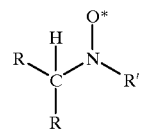

wherein R is selected from the group consisting of tertiary alkyl, aryl, alkaryl, haloaryl, carboxyaryl, alkoxyaryl, alkylthioaryl, pyridyl, and dialkylaminoaryl, and R' is tertiary alkyl. These nitroxides are said to be useful as traps for reactive free radicals both in the counting of free radicals and for inhibiting oxidation and free radical polymerization.

U.S. Pat. No. 3,494,930 discloses free radicals of the nitroxide type for use as initiators of free radical reactions, collectors of free radicals, polymerization inhibitors or antioxidants. They are constituted by nitrogenous bicyclic compounds in which one of the bridges comprises solely the nitroxide radical group and, in particular, by aza-9-bicyclo (3,3,1) nonanone-3-oxyl-9, and by aza-9-bicyclo (3,3,1) nonane oxyl-9.

U.S. Pat. No. 3,873,564 discloses compounds and a method for assaying enzymes by adding to a medium containing an enzyme a stable free radical compound having a stable free radical functionality which, when subjected to an enzyme catalyzed reaction, changes the environment of the free radical functionality. By following the change in the electron spin resonance spectrum as affected by the change in environment, the type of enzyme and the activity of the enzyme can be determined.

The compounds found useful are normally stable nitroxide radicals. Particularly nitronyl nitroxides, with the nitrogens in an imidazoline ring, are employed, having a methylene group joining the 2 position of the imidazoline ring with an asymmetric carbon atom. One of the groups bonded to the asymmetric carbon atoms has an enzyme labile functionality. Other compounds include two cyclic nitroxide containing rings joined by a chain having an enzyme labile functionality.

U.S. Pat. No. 3,966,711 teaches that 2,2,7,7-tetraalkyl- and 2,7-dispiroalkylene-5-oxo-1,4-diazacycloheptanes substituted in the 4-position by mono- or tetravalent radicals are powerful light-stabilizers for organic polymers. They are said to possess higher compatibility than their 4-unsubstituted homologues, from which they can be synthesized by reactions known for N-alkylation. Preferred substituents in the 4-position are alkyl, alkylene, alkenyl, aralkyl, and esteralkyl groups. The 1-nitroxyls derived from the imidazolidines by oxidation with hydrogen peroxide or percarboxylic acids are also said to be good light stabilizers.

U.S. Pat. No 4,182,658 discloses a method for preventing the polymerization of a readily polymerizable vinyl aromatic compound during distillation at elevated temperatures within a distillation apparatus that is subject to an emergency condition, such as a power outage. This method comprises force-feeding a supplemental polymerization inhibitor having a high solubility in the vinyl aromatic compound and a long duration of efficiency, into each of the distillation vessels of a conventional distillation apparatus in an amount sufficient to prevent polymerization therein.

European Patent Application 0 178 168 A2 discloses a method for inhibiting the polymerization of an α,β-ethylenically unsaturated monocarboxylic acid during its recovery by distillation by using a nitroxide free radical.

U.S. Pat. No 4,665,185 discloses a process for the efficient preparation of nitroxyls of sterically hindered amines by the oxidation of the amine using a hydroperoxide, in the presence of a small amount of a metal ion catalyst, at moderate temperature, for a short period of time to give the nitroxyl in high yield and purity.

U.S. Pat. No. 5,254,760 teaches that the polymerization of a vinyl aromatic compound, such as styrene, during distillation or purification, is very effectively inhibited by the presence of at least one stable nitroxyl compound together with at least one aromatic nitro compound.

U.S. Pat. Nos. 5,545,782 and 5,545,786 disclose that nitroxyl inhibitors in combination with some oxygen reduce the premature polymerization of vinyl aromatic monomers during the manufacturing processes for such monomers. Even small quantities of air used in combination with the nitroxyl inhibitors are said to result in vastly prolonged inhibition times for the monomers.

European Patent Application 0 765 856 A1 discloses a stabilized acrylic acid composition in which the polymerization of the acrylic acid is inhibited during the distillation process for purifying or separating the acrylic acid as well as during transport and storage. The compositions comprise three components: (a) acrylic acid, (b) a stable nitroxyl radical, and (c) a dihetero-substituted benzene compound having at least one transferable hydrogen (e.g., a quinone derivative such as the monomethyl ether of hydroquinone (MEHQ)). During the distillation process, transport and storage, components (b) and (c) are present in a polymerization-inhibiting amount. During the distillation process, oxygen (d) is preferably added with components (b) and (c). According to the specification, examples of suitable nitroxide free radical compounds include di-t-butylnitroxide; di-t-amylnitroxide; 2,2,6,6-tetramethyl-piperidinyloxy; 4-hydroxy-2,2,6,6-tetramethyl-piperidinyloxy; 4-oxo-2,2,6,6-tetramethyl-piperidinyloxy; 4-dimethylamino-2,2,6,6-tetramethyl-piperidinyloxy; 4-amino-2,2,6,6-tetramethyl-piperidinyloxy; 4-ethanoyloxy-2,2,6,6-tetramethyl-piperidinyloxy; 2,2,5,5-tetramethylpyrrolidinyloxy; 3-amino-2,2,5,5-tetramethylpyrrolidinyloxy; 2,2,5,5-tetramethyl-1-oxa-3-azacyclopentyl-3-oxy; 2,2,5,5-tetramethyl-1-oxa-3-pyrrolinyl-1-oxy-3-carboxylic acid; and 2,2,3,3,5,5,6,6-octamethyl-1,4-diazacyclohexyl-1,4-dioxy.

WO 98/14416 discloses that the polymerization of vinyl aromatic monomers such as styrene is inhibited by the addition of a composition of a stable hindered nitroxyl radical and an oxime compound.

CS-260755 B1 is directed to the preparation of 4-substituted-2,2,6,6-tetramethylpiperidine nitroxyls as olefin stabilizers.

SU-334845 A1 is directed to the inhibition of the radical polymerization of oligoester acrylates using iminoxyl radical inhibitors of a given formula.

SU-478838 is directed to the inhibition of the radical polymerization of oligoester acrylates and the prevention of oligomeric peroxides using a binary polymerization inhibitor comprising quinone.

The foregoing are incorporated herein by reference in their entirety.

SUMMARY OF THE INVENTION

As used herein, the abbreviation TEMPO stands for 2,2,6,6-tetramethyl-1-piperidinyloxy. Thus, 4-amino-TEMPO is 4-amino-2,2,6,6-tetramethyl-1-piperidinyloxy; 4-hydroxy-TEMPO is 4-hydroxy-2,2,6,6-tetramethyl-1-piperidinyloxy (also known in the art as HTEMPO); 4-oxo-TEMPO is 4-oxo-2,2,6,6-tetramethyl-1-piperidinyloxy; and so on.

As mentioned above, hindered nitroxyl compounds are known to be very active inhibitors of free radical polymerizations of unsaturated monomers such as styrene, acrylic acid, methacrylic acid, and the like. The present invention is based upon the discovery that 4-amino-TEMPO has an unusual characteristic when used in a test that simulates a manufacturing plant's loss of inhibitor feed to the distillation train. Under these conditions, most nitroxyl compounds permit the polymer to form at similar rates. But 4-amino-TEMPO permits polymer to form at significantly slower rates, as indicated by a lesser slope of a percent polymer versus time curve. This is advantageous in that it provides additional time for remedying a plant upset situation before an unacceptable amount of polymer is formed in the distillation train.

More particularly, the present invention is directed to a method for inhibiting the premature polymerization of ethylenically unsaturated monomers comprising adding to said monomers an effective amount of an inhibitor having the structural formula:

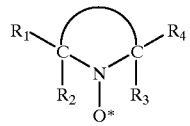

wherein $R_1$ and $R_4$ are independently selected from the group consisting of hydrogen, alkyl, and heteroatom-substituted alkyl and $R_2$ and $R_3$ are independently selected from the group consisting of alkyl and heteroatom-substituted alkyl and the

portion represents the atoms necessary to form a five-, six-, or seven-membered heterocyclic ring, at least one of said atoms being a carbon atom substituted with a primary, secondary, or tertiary amino group.

In a preferred embodiment, the present invention is directed to a method for inhibiting the premature polymerization of ethylenically unsaturated monomers comprising adding to said monomers an effective amount of an inhibitor having the structural formula

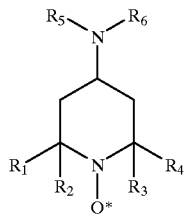

wherein $R_1$ and $R_4$ are independently selected from the group consisting of hydrogen, alkyl, and heteroatom-substituted alkyl, $R_2$ and $R_3$ are independently selected from the group consisting of alkyl and heteroatom-substituted alkyl and $R_5$ and $R_6$ are independently selected from the group consisting of hydrogen, alkyl, aryl, and acyl.

It is most preferred that the inhibitor be 4-amino-2,2,6,6-tetramethylpiperidinyloxy (i.e., 4-amino-TEMPO).

The effective amount of the nitroxyl compound is typically about 1 to 2,000 ppm, based on the weight of the ethylenically unsaturated monomer, although amounts outside this range may be appropriate depending upon the conditions of use. The amount of the nitroxyl compound is preferably about 5 to about 1,000 ppm, based on the weight of the ethylenically unsaturated monomer.

In another embodiment, the present invention is directed to a composition comprising:
(a) a ethylenically unsaturated monomer, and
(b) an effective inhibiting amount, to prevent premature polymerization of the ethylenically unsaturated monomer, of an inhibitor having the structural formula:

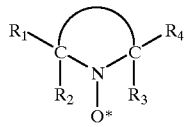

wherein $R_1$ and $R_4$ are independently selected from the group consisting of hydrogen, alkyl, and heteroatom-substituted alkyl and $R_2$ and $R_3$ are independently selected from the group consisting of alkyl and heteroatom-substituted alkyl

portion represents the atoms necessary to form a five-, six-, or seven-membered heterocyclic ring, at least one of said atoms being a carbon atom substituted with a primary, secondary, or tertiary amino group.

In another preferred embodiment, the present invention is directed to a composition comprising:
(a) a ethylenically unsaturated monomer, and
(b) an effective inhibiting amount, to prevent premature polymerization of the ethylenically unsaturated monomer, of an inhibitor having the structural formula:

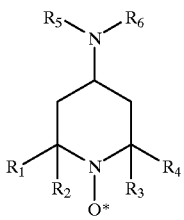

wherein wherein $R_1$ and $R_4$ are independently selected from the group consisting of hydrogen, alkyl, and heteroatom-substituted alkyl, $R_2$ and $R_3$ are independently selected from the group consisting of alkyl and heteroatom-substituted alkyl and $R_5$ and $R_6$ are independently selected from the group consisting of hydrogen, alkyl, aryl, and acyl.

DESCRIPTION OF THE PREFERRED EMBODIMENTS

Figure 1:
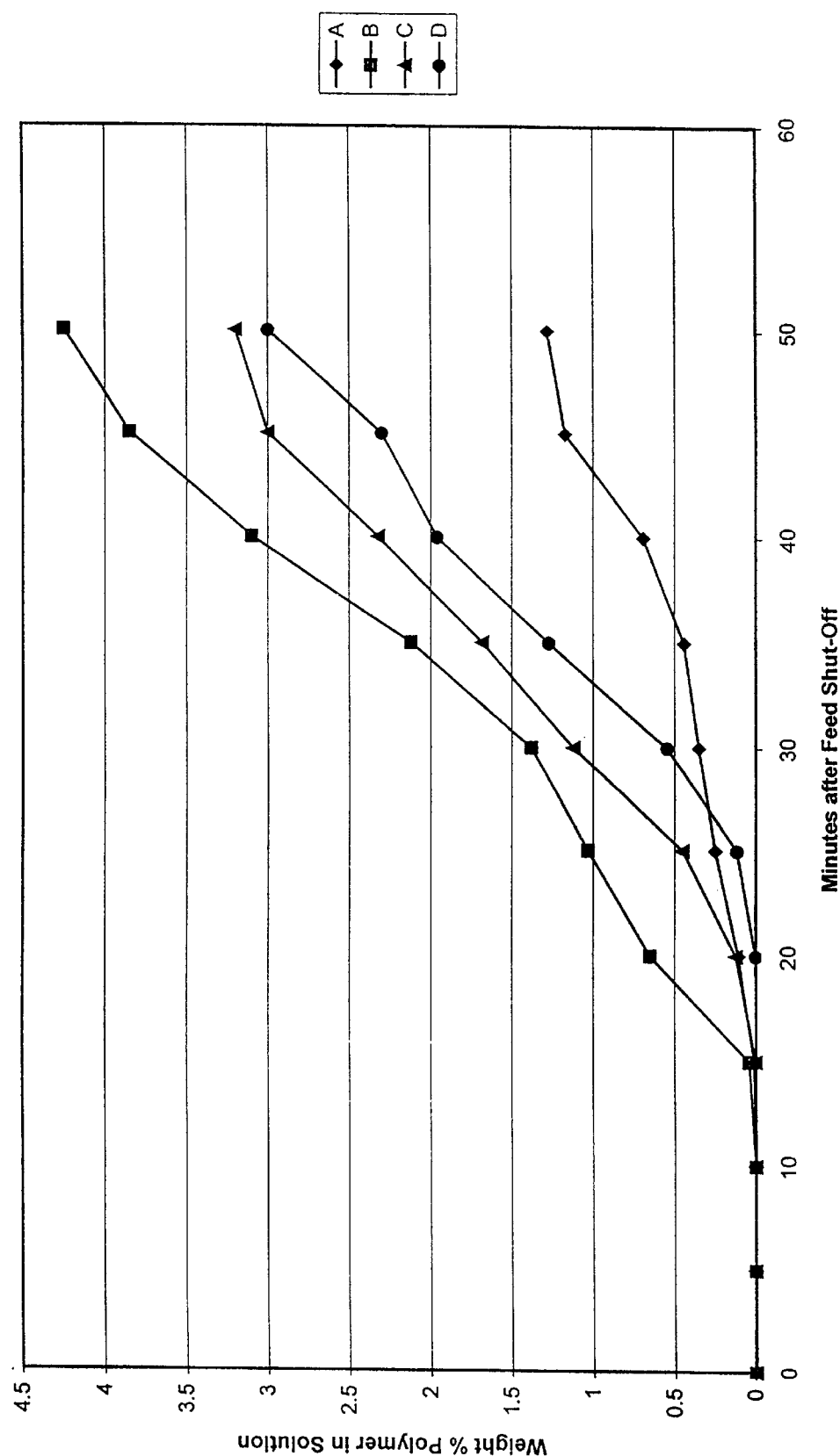
FIG. 1 is a graph showing the slow rate of polymerization of compositions of the present invention after the shutoff of reboiler feed in a steady state dynamic testing system, as compared with the rates provided by other species. In the FIGURE, A is 4-amino-TEMPO, B is 4-oxo-TEMPO, C is 4-hydroxy-TEMPO, and D is TEMPO.

As stated above, in one aspect, the present invention is directed to a method for inhibiting the premature polymerization of ethylenically unsaturated monomers comprising adding to said monomers an effective amount of an inhibitor having the structural formula:

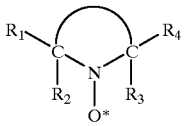

wherein $R_1$ and $R_4$ are independently selected from the group consisting of hydrogen, alkyl, and heteroatom-substituted alkyl and $R_2$ and $R_3$ are independently selected from the group consisting of alkyl and heteroatom-substituted alkyl and the portion represents the atoms necessary to form a five-, six-, or seven-membered heterocyclic ring, at least one of said atoms being a carbon atom substituted with a primary, secondary, or tertiary amino group. Such ring-completing atoms are preferably carbon atoms, but heteroatoms, such as O, N, or S, can also be present.

The inhibitor employed in the practice of the present invention preferably has the structural formula

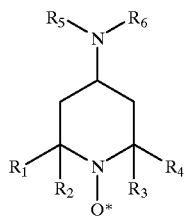

wherein $R_1$ and $R_4$ are independently selected from the group consisting of hydrogen, alkyl, and heteroatom-substituted alkyl, $R_2$ and $R_3$ are independently selected from the group consisting of alkyl and heteroatom-substituted alkyl, and $R_5$ and $R_6$ are independently selected from the group consisting of hydrogen, alkyl, aryl, and acyl.

Where $R_1$, $R_2$, $R_3$, or $R_4$ are alkyl, they are preferably of 1 to 15 carbon atoms (e.g., methyl, ethyl, propyl, butyl, pentyl, hexyl, heptyl, octyl, nonyl, decyl, undecyl, dodecyl, tridecyl, tetradecyl, pentadecyl, and the like) and isomers thereof (e.g., t-butyl, 2-ethylhexyl, and the like).

Where $R_5$ and/or $R_6$ are alkyl, it is preferred that they be a lower alkyl (i.e., one having one to four carbon atoms, e.g., methyl, ethyl, propyl, butyl, and isomers thereof).

Where $R_5$ and/or $R_6$ are aryl, it is preferred that they be aryl of from 6 to 10 carbon atoms, e.g., phenyl or naphthyl, which, in addition, may be substituted with non-interfering substituents, e.g., lower alkyl groups, halogens, and the like.

Where $R_5$ and/or $R_6$ are acyl, it is preferred that they be acyl of the structure

where $R_7$ is alkyl, aryl, $OR_8$, or $NR_8R_9$ and where $R_8$ and $R_9$, are alkyl, aryl, or

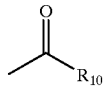

where $R_{10}$ is alkyl or aryl. Where $R_7$, $R_8$, $R_9$, or $R_{10}$ are alkyl, they are preferably alkyl of from 1 to 15 carbon atoms, more preferably lower alkyl of from 1 to 4 carbon atoms, as described above. Where $R_7$, $R_8$, $R_9$, or $R_{10}$ are aryl, they are preferably aryl of from 6 to 10 carbon atoms, as described above.

The inhibitor is preferably 4-amino-TEMPO.

Although the above structural formula indicates that the cyclic nitroxides employed in the practice of the present invention are saturated piperidine derivatives, they can also be unsaturated piperidine derivatives of the formula:

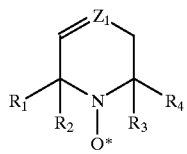

wherein $Z_1$ is $=C(NR_5R_6)—$.

The cyclic nitroxides employed in the practice of the present invention can also be derived from five-membered rings, i.e., pyrrolidines. These compounds are of the structure:

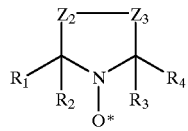

wherein $Z_2$ and $Z_3$ are substituted or unsubstituted carbon atoms, provided that at least one of $Z_2$ and $Z_3$ is $>CNR_5R_6$. The other of $Z_2$ and $Z_3$ can be the same or different and can be oxygen, nitrogen, sulfur, $>CH_2$, $>CHCH_3$, $>C=O$, $>C(CH_3)_2$, $>CHBr$, $>CHCl$, $>CHI$, $>CHF$, $>CHOH$, $>CHCN$, $>C(OH)CN$, $>CHCOOH$, $>CHCOOCH_3$, $>CHCOOC_2H_5$, $>C(OH)COOC_2H_5$, $>C(OH)COOCH_3$, $>C(OH)CHOHC_2H_5$, $>CNR_5R_6$, $>CCONR_5R_6$, $>CH=NOH$, $>C=CH—C_6H_5$, $CF_2$, $CCl_2$, $CBr_2$, $CI_2$, and the like, where $R_5$ and $R_6$ are as described above.

The cyclic nitroxides employed in the practice of the present invention can also be derived from pyrrolines and have the structure:

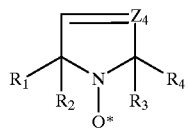

wherein $Z_4$ is $=C(NR_7R_8)—$ where $R_5$ and $R_6$ are as described above.

Another class of cyclic nitroxides that can be employed in the practice of the present invention is of the structure:

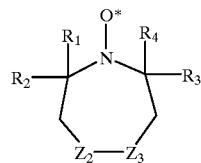

wherein $Z_2$ and $Z_3$ are as described above.

As stated above, $R_1$ and $R_4$ are independently selected from the group consisting of hydrogen, alkyl, and heteroatom-substituted alkyl and $R_2$ and $R_3$ are independently selected from the group consisting of alkyl and heteroatom-substituted alkyl. The alkyl (or heteroatom-substituted alkyl) groups $R_1$ through $R_4$ can be the same or different and preferably contain 1 to 15 carbon atoms. It is more preferred that $R_1$ through $R_4$ be lower alkyl (or heteroatom-substituted lower alkyl) of 1 to 4 carbon atoms (e.g., methyl, ethyl, propyl, butyl, and isomers thereof). Where heteroatom substituents are present, they can, for example, include halogen, oxygen, sulfur, nitrogen, and the like. It is most preferred that all of $R_1$ through $R_4$ be methyl.

Such stable nitroxide free radical compounds can be prepared by known methods. (See, for example, U.S. Pat. Nos. 3,163,677; 3,334,103; 3,372,182; 3,422,144; 3,494,930; 3,502,692; 3,873,564; 3,966,711; and 4,665,185.) They are suitable for use over a wide range of temperatures. But distillation temperatures employed with the ethylenically unsaturated monomers that are stabilized by the process of the present invention typically range from about 60° C. to about 180° C., preferably from about 70° C. to about 165°

C., and, more preferably, from about 80° C. to about 150° C. Such distillations are generally performed at an absolute pressure in the range of about 10 to about 1,200 mm of Hg.

The ethylenically unsaturated monomer, the premature polymerization of which is an object of the present invention, can be any such monomer for which unintended polymerization during its manufacture, storage, and/or distribution is a problem. Among those monomers that will benefit from the practice of the present invention can be listed: styrene, α-methylstyrene, styrene sulfonic acid, vinyltoluene, divinylbenzenes, polyvinylbenzenes, alkylated styrene, 2-vinylpyridine, and the like.

The ethylenically unsaturated monomers will not necessarily be stabilized indefinitely by the presence of the nitroxide, especially when the monomers are heated as in distillation, but they can be considered to be stabilized as long as there is a measurable increase in the time for which they can be heated before the onset of polymerization.

Those skilled in the art will understand that additional free radical scavengers can, if desired, be included in the stabilized compositions and the methods for preparing them that are the subject of the present invention. For example, air or $O_2$, as disclosed in U.S. Pat. Nos. 5,545,782 and 5,545,786, can be added, as can the aromatic nitro compounds disclosed in U.S. Pat. No 5,254,760, the dihetero-substituted benzene compounds having at least one transferable hydrogen, e.g., a quinone derivative such as the mono-methyl-ether of hydroquinone disclosed in European Patent Application 0 765 856 A1, and other inhibitors, e.g., phenolics and certain inorganic salts, well-known to those skilled in the art.

The polymerization inhibitor can be introduced into the monomer to be protected by any conventional method. It can be added as a concentrated solution in suitable solvents just upstream from the point of desired application by any suitable means. In addition, the inhibitor can be injected separately into the distillation train along with the incoming feed, or through separate entry points provided there is an efficient distribution of the inhibitor. Since the inhibitor is gradually depleted during the distillation operation, it is generally necessary to maintain the appropriate amount of the inhibitor in the distillation apparatus by adding additional amounts during the course of the distillation process. Adding inhibitor can be carried out either on a generally continuous basis or intermittently in order to maintain the concentration above the minimum required level.

The advantages and the important features of the present invention will be more apparent from the following examples.

EXAMPLES

Procedure for Dynamic Reboiler Test with Feed Shut-Off

Preparation of Feed Solution

T-Butylcatechol (TBC) is removed from commercially available styrene by distillation under vacuum. Removal of TBC is verified by caustic titration. The desired amount of inhibitor is added to this TBC-free styrene either directly or by first making a concentrated solution of the inhibitor in TBC-free styrene followed by further dilution with TBC-free styrene.

Procedure for Dynamic Reboiler Test

A quantity of the Feed Solution containing inhibitor (blend) at the desired charge (stated as a wt/wt total inhibitor to styrene) is added to a round-bottom flask (the "Pot") and heated to the desired temperature (usually 116° C.) and brought to reflux by adjusting the pressure/vacuum. Once the Pot contents are at temperature, a continuous stream of fresh Feed Solution is begun at a rate that will add the volume of the initial Pot solution to the Pot over a period of time called the residence time (typically one hour). At the same time that the fresh Feed Solution flow is begun, the Bottoms Stream flow is also begun. The Bottoms Stream is solution in the Pot that is removed at the same rate as the fresh Feed Solution is added. The equal flows of Feed and Bottoms streams cause the quantity in the Pot to remain constant over the time of the experiment while allowing continuous replenishment of inhibitor. This procedure simulates the way inhibitors are used in a distillation train of a plant producing vinyl monomers. The experiment continues with flow in and out of the Pot for a specified period of time, typically seven hours. Samples are collected hourly from the Bottoms Stream. These samples are analyzed for polymer content via the methanol turbidity method. The amount of polymer in the samples is an indication of effectiveness of the inhibitor being tested.

Procedure for Feed Shut-Off

At the end of the Reboiler Test Run (typically seven hours), a sample is collected from the Bottoms Stream. This sample corresponds to Feed Shut-Off Time=0 minutes. The flows of fresh Feed Solution and Bottoms Stream are stopped. The vacuum and temperature are monitored and adjusted to maintain boiling at the desired temperature of the experiment. Samples are periodically removed from the Pot (typically every five minutes). These samples are analyzed for polymer content via the methanol turbidity method. Data during this time is used to generate the "Feed Shut-Off Curve" for the run.

A less steep slope in the Feed Shut-Off Curve (slower rate of polymer production over time) indicates a more effective inhibiting system in the event of a loss of feed in the plant. A longer period of time before initiation of significant polymer formation is also an indication of a more effective inhibiting system in the event of a loss of feed in the plant. A preferred system will have a long delay prior to initiation of polymer formation followed by a slow rate of polymer production once initiated.

The above procedure is carried out using 4-amino-TEMPO, 4-oxo-TEMPO, 4-hydroxy-TEMPO, and TEMPO as the inhibitors. The results are shown in FIG. 1 and clearly indicate the improvement that is realized by employing 4-amino-TEMPO, as opposed to equal quantities of any of the other three nitroxide inhibitors. The data for the graph of FIG. 1 are shown in Table 1.

TABLE 1

Reboiler Runs of Five Different Nitroxides
116° C./One Hour Res. Time
(% Polymer)

| Time (Hours) | A (100 ppm) | B (100 ppm) | C (100 ppm) | D (100 ppm) |
|---|---|---|---|---|
| 0 | 0 | 0 | 0 | 0 |
| 2 | 0.0003 | 0.0013 | 0.00038 | 0.00025 |
| 3 | 0.00037 | 0.0011 | 0.00068 | 0.00024 |
| 4 | 0.0004 | 0.0013 | 0.001 | 0.00024 |
| 5 | 0.00046 | 0.0017 | 0.0012 | 0.0003 |
| 6 | 0.00049 | 0.0017 | 0.0012 | 0.0004 |
| 7 | 0.00052 | 0.0017 | 0.0012 | 0.00037 |

TABLE 1-continued

Reboiler Runs of Five Different Nitroxides
116° C./One Hour Res. Time
(% Polymer)

| Time (min.-F/SO) | A (100 ppm) | B (100 ppm) | C (100 ppm) | D (100 ppm) |
|---|---|---|---|---|
| 0 | 0 | 0 | 0 | 0 |
| 5 | 0.00064 | 0.0024 | 0.0012 | 0.00038 |
| 10 | 0.0004 | 0.0024 | 0.0012 | 0.00044 |
| 15 | 0.0135 | 0.043 | 0.002 | 0.00030 |
| 20 | 0.108 | 0.65 | 0.123 | 0.0013 |
| 25 | 0.25 | 1.03 | 0.45 | 0.117 |
| 30 | 0.35 | 1.38 | 1.12 | 0.545 |
| 35 | 0.44 | 2.12 | 1.68 | 1.27 |
| 40 | 0.69 | 3.1 | 2.32 | 1.96 |
| 45 | 1.17 | 3.85 | 3 | 2.3 |
| 50 | 1.28 | 4.25 | 3.2 | 3 |

A is 4-amino-TEMPO
B is 4-oxo-TEMPO
C is 4-hydroxy-TEMPO
D is TEMPO
F/SO is Feed Shut-Off In view of the many changes and modifications that can be made without departing from principles underlying the invention, reference should be made to the appended claims for an understanding of the scope of the protection to be afforded the invention.

What is claimed is:

1. A method for inhibiting the premature polymerization of an ethylenically unsaturated monomer selected from the group consisting of styrene, α-methylstyrene, styrene sulfonic acid, vinyltoluene, divinylbenzenes, polyvinylbenzenes, alkylated styrene, and 2-vinylpyridine comprising adding to said monomer an effective amount of an inhibitor having the structural formula:

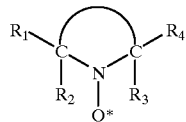

wherein $R_1$ and $R_4$ are independently selected from the group consisting of hydrogen, alkyl, and heteroatom-substituted alkyl, $R_2$ and $R_3$ are independently selected from the group consisting of alkyl and heteroatom-substituted alkyl, and the

portion represents the atoms necessary to form a five-, six-, or seven-membered heterocyclic ring, at least one of said atoms being a carbon atom substituted with a primary or tertiary amino group.

2. The method of claim 1 wherein the ethylenically unsaturated monomer is styrene.

3. The method of claim 1 wherein the inhibitor has the structural formula

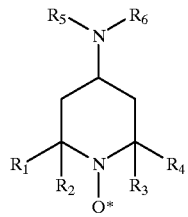

wherein $R_1$ and $R_4$ are independently selected from the group consisting of hydrogen, alkyl, and heteroatom-substituted alkyl, $R_2$ and $R_3$ are independently selected from the group consisting of alkyl and heteroatom-substituted alkyl, and $R_5$ and $R_6$ are the same and are selected from the group consisting of hydrogen, alkyl, aryl, and acyl.

4. The method of claim 3 wherein $R_5$ and $R_6$ are hydrogen.

5. The method of claim 3 wherein the ethylenically unsaturated monomer is styrene.

6. The method of claim 3 wherein $R_1$, $R_2$, $R_3$, and $R_4$ are independently selected alkyl groups.

7. The method of claim 6 wherein $R_5$ and $R_6$ are hydrogen.

8. The method of claim 7 wherein $R_1$, $R_2$, $R_3$, and $R_4$ are all methyl.

9. The method of claim 8 wherein the ethylenically unsaturated monomer is styrene.

* * * * *